L. W. BUGBEE.
PROCESS OF MAKING BIFOCAL LENSES.
APPLICATION FILED JUNE 16, 1919.
1,416,444. Patented May 16, 1922.
2 SHEETS—SHEET 1.
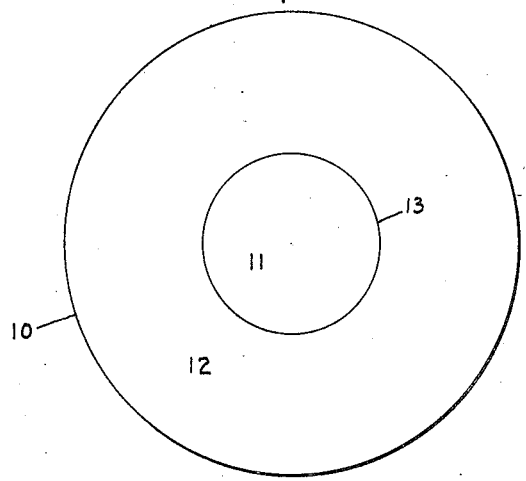
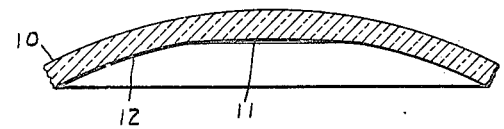
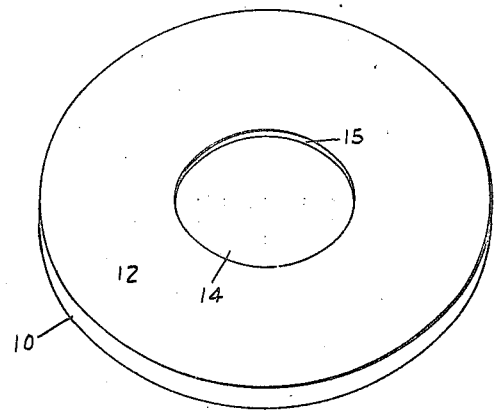
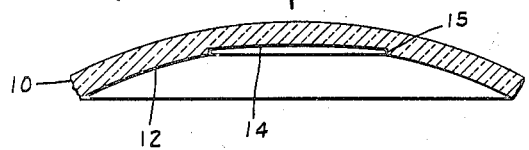
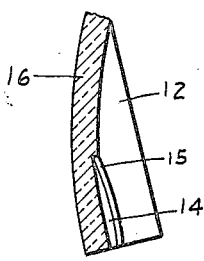
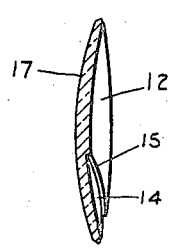
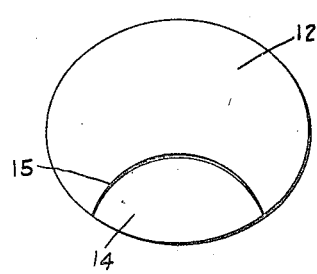
INVENTOR.
LUCIAN W. BUGBEE
BY
ATTORNEYS L. W. BUGBEE.
PROCESS OF MAKING BIFOCAL LENSES.
APPLICATION FILED JUNE 16, 1919.
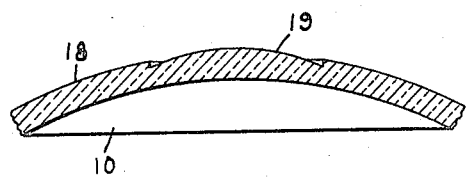
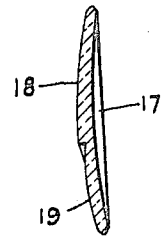
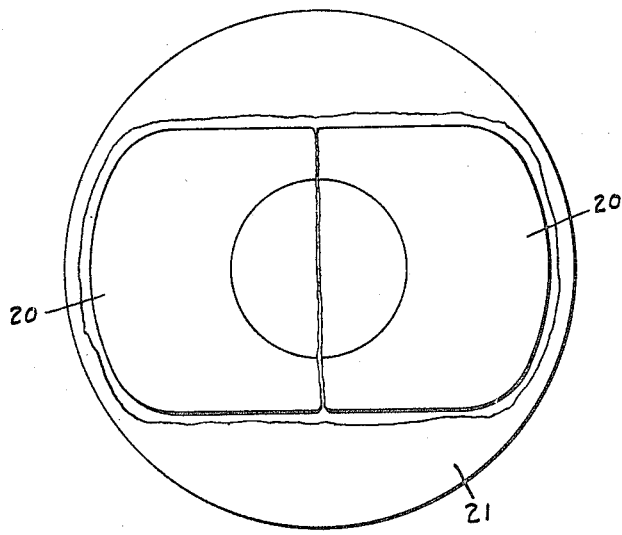
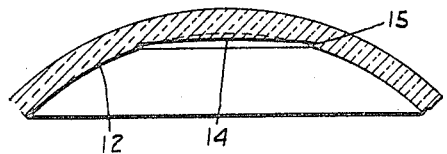
INVENTOR.
LUCIAN W. BUGBEE
BY
ATTORNEYS.

UNITED STATES PATENT OFFICE.

LUCIAN W. BUGBEE, OF INDIANAPOLIS, INDIANA, ASSIGNOR, BY MESNE ASSIGN-MENTS, TO TWINSIGHT OPTICAL COMPANY, OF INDIANAPOLIS, INDIANA.

PROCESS OF MAKING BIFOCAL LENSES.

1,416,444.     Specification of Letters Patent.     Patented May 16, 1922.

Application filed June 16, 1919. Serial No. 304,690.

*To all whom it may concern:*

Be it known that I, LUCIAN W. BUGBEE, a citizen of the United States, and a resident of Indianapolis, county of Marion, and State of Indiana, have invented a certain new and useful Process of Making Bifocal Lenses; and I do hereby declare that the following is a full, clear, and exact description thereof, reference being had to the accompanying drawings, in which like numerals refer to like parts.

The object of this invention is to manufacture onepiece bifocal lenses wherein the reading surface is depressed relative to the distance surface so as to leave a substantially uniform abrupt shoulder between the two surfaces with the ends thereof downwardly curved, and more particularly to make bifocal lenses from blanks which have been defectively ground, polished or otherwise formed at the junction between the reading surfaces and distance surfaces, so that the same will not make perfect or satisfactory merged surface onepiece bifocal lenses. This last mentioned process has several distinct advantages in simplifying and cheapening the process, and making the production of lenses extremely accurate and satisfactory.

The full nature of the invention will be understood from the accompanying drawings and following description and claims.

In the drawings, Fig. 1 is a target lens blank ground or formed on one face thereof with two visual surfaces of different dioptrics substantially merging. Fig. 2 is a central section through Fig. 1. Fig. 3 is a perspective view of the target lens blank after the central or reading surface has been separately ground and depressed. Fig. 4 is a cross section of Fig. 3. Fig. 5 is a vertical central section through a single lens blank made from the target shown in Figs. 3 and 4. Fig. 6 is a central vertical section through a finished lens made from the blank in Fig. 5. Fig. 7 is a view substantially in plan, but partially in perspective, of the finished lens. Fig. 8 is a central section through a target, like that shown in Fig. 4, but with the bifocal surface on the convex side. Fig. 9 is a central vertical section through a finished lens made from the blank shown in Fig. 8. Fig. 10 is a plan view of a lens holder with a double lens blank secured thereon. Fig. 11 is a cross section of a target lens blank with the distance or surrounding surface being given a relatively high degree of curvature.

In the first place a piece of glass 10 large enough to form two finished lenses therefrom, is ground on one face to form two concentric visual surfaces of different dioptrics. There is a central surface 11, usually called the reading surface, and it is surrounded by an annular surface 12, usually called the distance surface. The distance surface 12 is ground to an accurate curvature of say six dioptrics. The central surface may be of any desired form and the two surfaces substantially merged at the line of joinder 13, although such line of joinder need not be made so as to accurately merge the two surfaces. The cross section shown in Fig. 2 illustrates approximately the form and relative positions of said surfaces.

The next step of the process is to finish the central or reading surface 11, as shown in Figs. 3 and 4, by grinding the glass to form a depressed central surface 14 having the exact curvature or dioptric required, and with an abrupt or right angled shoulder 15 formed between the two visual surfaces 12 and 14. In the usual manufacture this shoulder is of uniform height or thickness throughout, as the two surfaces preferably have coincident axes of generation. After the target lens blank has been formed, as shown in Figs. 3 and 4, it is split into two halves to form a pair of lens blanks 16, like that shown in Fig. 5, the reading surface 14 of the last lens blank being substantially semi-circular and located at the lower edge of the blank and half surrounded by the distance surface 12. This is the usual form in which the article is sold to opticians, who subsequently make the finished lenses, as shown in Figs. 6 and 7, although, of course, the manufacturer of the bank 5 can also finish the lenses if desired.

The lens is finished by forming the face 17 of the lens opposite the bifocal face of the desired curvature called for by the prescription so as to give the finished lens the desired form and suitably locate the optical centers of the two visual surfaces. Then the lens is edged and finished substantially as shown in Figs. 6 and 7, that is with the reading surface depressed as compared with the distance surface so as to leave an overhanging shoulder of substantially uniform thickness. In this sort of lens there is little or no liability of dirt accumulating at the shoulder because of its overhanging form, and when the shoulder is formed abrupt with the angles thereof substantially right angles, it makes a comparatively good lens relatively free from chromatic aberration and annoyance to the eye.

The form shown in the first seven figures are those employed in the process of making concave bifocal lenses. The process also is employed in making convex bifocal lenses, as shown in Figs. 8 and 9. In that process the target lens blank is made substantially as shown in Figs. 1 and 2, excepting that the surfaces are formed on the convex side of the lens blank forming the surrounding distance surface 18 and the central reading surface 19 substantially merged therewith. Then the reading or central surface 19 is finished in the convex form, as in the concave form, by a process the same substantially as shown in Fig. 8. Thereafter the target is split and a pair of lens blanks made substantially like Fig. 4, excepting that the bifocal surfaces are on the convex sides. Then the finished lenses are made substantially like that shown in Fig. 9.

While in Fig. 1 the target lens blank is shown made of a single piece of glass, it is not necessary to use a single piece of glass and grind concentric bifocal lens blanks thereon and subsequently split it to make a pair of lens blanks, for much the same result is attained by splitting the glass before the bifocal surfaces are formed instead of after they are formed, according to the desire of the manufacturer. If desired two pieces of glass 20 can be abutted together and secured upon the lens holder 21 of the usual type and in the usual way and then ground and treated just the same as the other lens blank, the two bifocal surfaces being formed thereon in the same way and the central reading surfaces being finished and depressed while the pieces of glass are still secured to the lens holder. When they are moved from the lens holder they are in the form of a pair of lens blanks like that shown in Fig. 5 and the only difference is that the glass on the lens holder is formed into a pair of blanks before the bifocal surface is formed instead of afterwards.

It is extremely important and practically vital in the process of making the type of lens herein referred to, that the process just mentioned be employed. By generating the two bifocal surfaces simultaneously, or in the first instance so as to substantially merge with each other, the desired curvature or dioptrics of the reading portion of the lens, or the central portion of the target lens, will have been established when this first grinding operation has been made. Then all that is necessary to make the depression of the reading or central portion is to grind the same on substantially the same curvature, and also very little grinding will be necessary as the grinding in this second operation takes place at all points of the reading or central portion from the beginning of this second grinding operation and equally. Whereas, if in the first instance a single curvature, say six dioptrics is given to the lens blank, the reading or central portion will be centrally ground away in the first grinding operation so that a relatively deep shoulder must be made in the second part of the grinding operation, when the reading or central portion is being ground, in order to finish that surface, and during the first part of the second grinding operation the central portion of the second lap will not be grinding as it will not be touching the lens. In the present process all that is necessary is to grind the central or reading portion sufficiently to make a shoulder of the desired depth, thus greatly reducing the expense of such second step in the grinding as compared with the former process, and also avoiding the inaccuracy of it and always making a uniform shoulder. This is shown in Figs. 8 and 11.

Thus in Fig. 11 there is shown a target lens blank with the distance surface 12 covering a higher degree of curvature than the corresponding surface in Fig. 4, as is often required in prescriptions, and the point to which attention is called is that in such lens, with this process, it is not necessary to grind the reading surface 14 down further than is necessary to obtain a marked shoulder 15, as indicated, and that the thickness of the glass at the center is greater than it is at the margin. If this lens were made by first grinding, the concave surface with a single curvature of the same dioptric as the surface 12, the surface 14 would have to be ground down so deeply in order to obtain a proper reading surface that the shoulder would be abnormally high, more than twice as high as shown. In other words the surface 14 would have to be ground down below the dotted line continuation of surface 12.

The invention claimed is:

1. The process of making onepiece bifocal lenses, which process includes the formation upon one face of glass of two surfaces substantially merging, and corresponding substantially with the distance and reading surfaces of a bifocal lens, and thereafter abrading the reading surface so as to make it a depression surrounded by a shoulder dividing the two surfaces.

2. The process of making onepiece bifocal lenses, which process includes grinding upon one face of glass two surfaces of different dioptrics and substantially merging at their line of joinder, and corresponding substantially with the distance and reading surfaces of a bifocal lens, and thereafter abrading the reading surface so as to make it a depression surrounded by a shoulder between the two surfaces.

3. The process of making onepiece bifocal lenses which process consists of grinding a target lens blank with a central reading surface and a surrounding distance surface of different dioptrics and substantially merging with each other, thereafter abrading the central surface so as to make it a depression and leave a shoulder between the two surfaces, then splitting the prescribed lens blank in to a pair of lens blanks, and then thereafter finishing the prescription and forming the finished lenses.

4. The process of making onepiece bifocal lenses, which process includes the formation upon one face of glass of two surfaces of different dioptrics and of substantially the desired curvature of the finished bifocal lens, and thereafter further abrading the reading surface so as to make it a depression and leave an overhanging shoulder dividing the two surfaces.

5. The process of making onepiece bifocal lenses, which process includes the simultaneous generation on one face of glass of two surfaces of desired dioptrics, and thereafter further grinding the reading surface so as to depress the same and leave an overhanging shoulder dividing the two surfaces.

6. The process of making onepiece bifocal lenses, which process includes the formation upon one face of glass of the distance surface of the lens, and thereafter forming the reading surface so that it will be depressed to leave an overhanging shoulder of any desired depth.

In witness whereof, I have hereunto affixed my signature.

LUCIAN W. BUGBEE.